Figure 1:
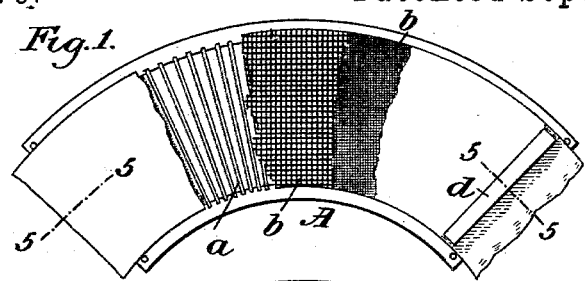

(No Model.) 2 Sheets—Sheet 1.

W. W. McEWAN.
PAPER VESSEL AND METHOD OF MAKING SAME.

No. 546,179. Patented Sept. 10, 1895.

Witnesses
L. A. Ommer Jr.
Edgar T. Brandenburg.

Inventor
William W. McEwan
By Chas. S. Sturtevant
Attorney

ANDREW B.GRAHAM, PHOTO-LITHO. WASHINGTON, D.C.

(No Model.) 2 Sheets—Sheet 2.
W. W. McEWAN.
PAPER VESSEL AND METHOD OF MAKING SAME.

No. 546,179. Patented Sept. 10, 1895.

Witnesses
J. R. Ommer
Edgar T. Brandenburg

Inventor
William W. McEwan
By Chas. S. Sturtevant
Attorney

UNITED STATES PATENT OFFICE.

WILLIAM W. McEWAN, OF WHIPPANY, NEW JERSEY.

PAPER VESSEL AND METHOD OF MAKING SAME.

SPECIFICATION forming part of Letters Patent No. 546,179, dated September 10, 1895.

Application filed February 8, 1895. Serial No. 537,705. (No model.)

*To all whom it may concern:*

Be it known that I, WILLIAM W. MCEWAN, a citizen of the United States, residing at Whippany, in the county of Morris, State of New Jersey, have invented certain new and useful Improvements in Paper Vessels and Methods of Making the Same, of which the following is a description, reference being had to the accompanying drawings, and to the letters of reference marked thereon.

My invention relates to an improvement in pails or other similar articles constructed of wood or other pulp and also relates to the method of forming said articles.

The object of the invention is to provide, in addition to the new process of manufacture, an improved pail which shall be simple in construction, cheap to manufacture, and shall, when the various parts are put together, make a seamless pail possessing great strength and durability and which may be treated in the ordinary way for carrying water or any other substance. I am aware that it has been heretofore proposed to make a vessel of fibrous pulp in which the body is molded with its ends beveled to make a lap-joint, said body being molded in the form of a sector and having its shorter side also beveled to correspond with an upstanding peripheral beveled flange on the molded bottom of said pail, and that it has been proposed to apply the beveled side edge of the body to the beveled upstanding edge flange of the bottom and to compress the vessel thus assembled to integrality at the lap-joints formed by the bevels. It will be readily seen, however, that with such a construction there is practically an oblique cut from the point where the bottom of the pail joins the vertical side to a point on the external periphery of the pail, so that no matter how firmly the parts may be compressed there will always be this weak point and danger under a considerable weight of the bottom dropping away from the body of the pail.

To overcome these and other disadvantages, and to carry out the object above referred to, the invention comprises, first, a pail or other vessel, formed of wood or other pulp, having a body molded and adapted to be joined end to end and having its lower edge formed with a beveled recess and its bottom formed with its outer edge on a corresponding bevel adapted to fit said recess.

Secondly. The invention comprises a pail or other vessel of wood or other suitable pulp, having a body molded and lapped end upon end forming a lap-joint from top to bottom with a corrugated metallic piece fitting between the overlapping portions and a suitable bottom secured to the body portion.

Thirdly. It comprises a pail or other vessel of wood or other suitable pulp having a body molded and lapped end upon end forming a lap-joint from top to bottom, and an ear riveted to said body at the joint, whereby the rivets which hold the ear in place serve to secure the lapped portions together, a bail attached at one end to the ear, and a suitable bottom secured to the body portion.

Fourthly. The invention consists in the process of making vessels from molded pulp, which consists in molding a sectoral body with its ends provided with tongues of less thickness than the thickness of the body portion, and the shorter side provided with an internal peripheral beveled recess, and molding a bottom with an external peripheral bevel to fit the recess in the body portion, then curving the body and lapping its tongues one upon the other and applying the beveled internal recess to the beveled external periphery of the bottom and compressing the vessel thus assembled to integrality at the joints.

Finally, the invention consists in the matters hereinafter described, and referred to in the appended claims.

The invention is illustrated in the accompanying drawings, in which—

Figure 2:
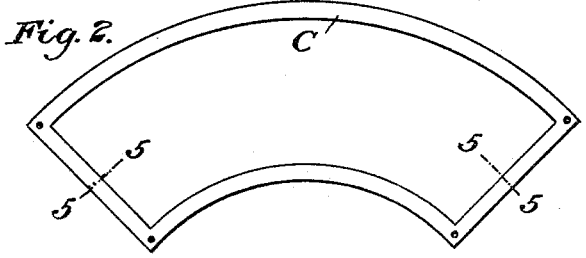
Figure 3:
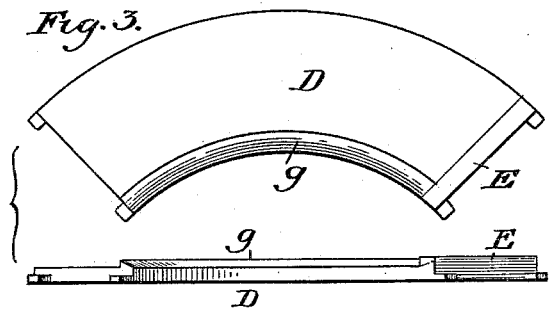
Figure 4:
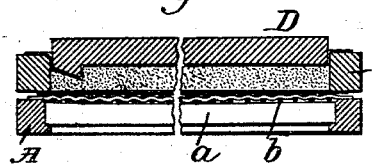
Figure 5:
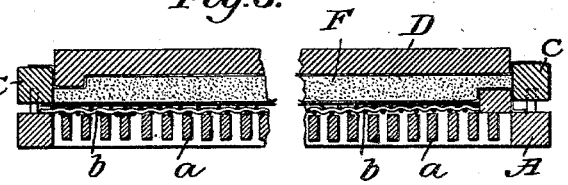
Figure 6:
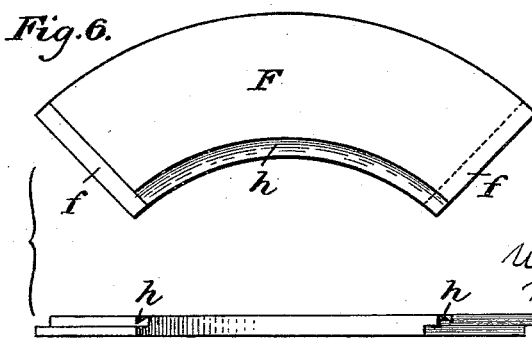
Figure 7:
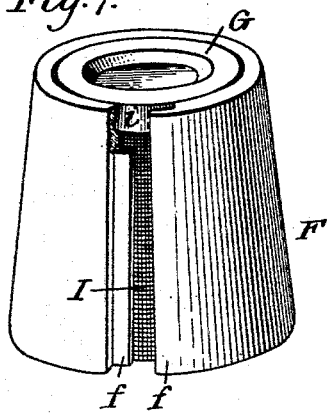
Figure 8:
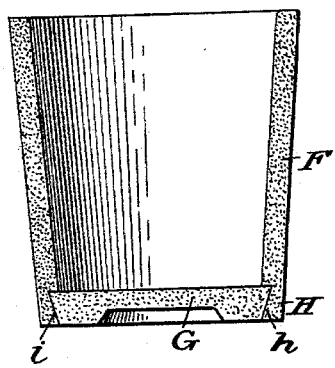
Figure 9:
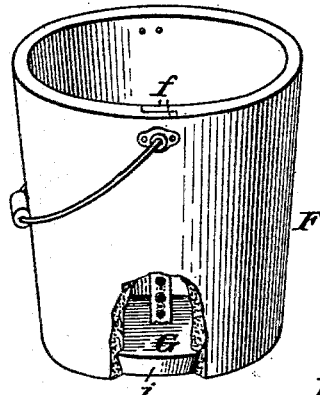
Figure 10:
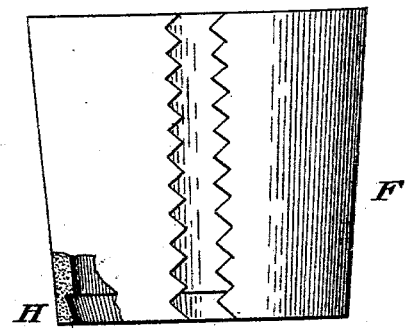
Figure 11:
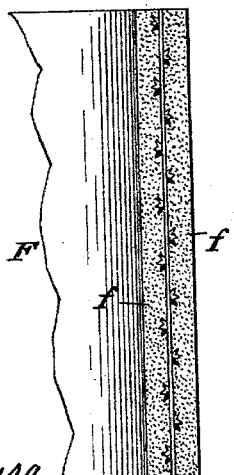

Figure 1 is a plan view of the bottom of the mold. Fig. 2 is a plan view of the cope. Fig. 3 is a combined plan and edge view of the platen or press-board. Fig. 4 is a cross-section of the mold. Fig. 5 is a longitudinal section of each end of the mold, taken on lines 5 5 of Figs. 1 and 2. Fig. 6 is a plan and edge view of the body of the pail. Fig. 7 is a perspective view of the former, with the body of the pail and bottom partially applied. Fig. 8 is a longitudinal sectional view of the pail. Fig. 9 is a perspective view of the completed pail, partly broken away. Fig. 10 is a side elevation of a modification of the body of the pail, and Fig. 11 shows a detail of the lap-joint.

In the drawings, A represents the drag or lower part of the mold which is the desired shape of the side of the pail. This mold is provided with a series of radial strips $a$, and over the entire surface of the mold is laid a strip of wire-cloth $b$, and in operation this wire-cloth is preferably covered with a strip of linen or muslin to prevent adherence of the pulp to the wire and more readily facilitate handling of the molded strip. This mold is provided with dowel-pins at its ends and upon the same is fitted a strip $d$, which, with another strip on the press-board, provide for the formation of a tongue $f$ on either end of the molded body of the pail. The cope is simply a framework which fits over the mold and acts to hold the pulp which is poured onto the mold from the beater in place. The desired thickness is given to the molded strip by means of the press-board D, which is provided at one end with a strip E, put on for the purpose of casting a tongue on the other end of the molded blank or body, and said press-board has also a beveled strip $g$ arranged along its shorter side which forms a beveled recess $h$ along the entire shorter side of said body portion. The mold or frame and the press-board are all sectoral in form and the thickness of the molded body varies according to the amount of pulp placed in the mold and the amount of pressure on the board. In addition to the linen strip above the bottom part of the mold I preferably place over the pulp when it is first poured into the mold another linen strip to prevent adherence of the pulp to the press-board, and, further, by reason of the pulp being contained between these linen strips, it is more readily handled and bent into the shape desired. The bottom of the pail is formed in similar manner in a mold, except that the exterior periphery of said bottom portion is formed on a bevel $i$, which fits the beveled recess in the body portion. The pulp as it comes from the beater is first poured into the mold upon which the frame has been placed, the press-board is then placed in position, and by reason of the formation of these parts the body or blank to form the side wall comes out molded in the form shown in Fig. 6, having the body portion F, the tongues $f$, which are adapted to overlap, and the beveled recess $h$ in the shorter side of the molded strip. The bottom G is formed as shown and has the downwardly-projecting marginal flange H, constituting the chine of the pail and the beveled portion $i$. The bottom of the pail is then placed upside down on the former shown in Fig. 7, and the body portion is bent around the former I, so that the tongues $f$ overlap and the shorter side of the body portion comes flush with the chine of the bottom, and the wide portion of the bottom just fits under the shoulder formed by the beveled recess in the body portion, as shown in Figs. 8 and 9. By looking at Fig. 9 it will be seen that, as the lower part of the body of the pail extends entirely down to the bottom flush with the chine, and as it is provided with the beveled recess, and the bottom of the pail is made wider at its top portion than at the bottom, so as to fit into the beveled recess and beneath the shoulder formed by the reduction in thickness of the lower part of the body, it is impossible, when the sides of the body portion are properly secured together, for the bottom to be removed from the body portion, since there is a wedging action of the two parts, one on the other, which effectually prevents any separation.

When the parts are placed around the former, the moisture has not all been expelled from the pulp, so that by a process of "patting" the joints they may be made to adhere very strongly and practically be integral, no line of juncture being visible. After this patting is completed, the article is further compressed and then dried and then submitted to the ordinary processes of sandpapering and waterproofing, if desired. The body portion is secured around the former by rubber bands or in any other suitable way, and the linen strips, by which handling of the molded body is made easy, are removed at the proper time, the inside one just before the body is put on the former and the outer one after the compression of the body on the former.

In Figs. 9 and 10 I show two views of a modification of the invention, or rather a further improvement thereof, which renders the pail stronger. Between the tongues $f$, I place a metal piece which is corrugated, toothed, punched, or otherwise roughened on both its faces, so that the projections thereon will in the joining operation pass into both tongues, thus strengthening the joint and uniting the parts, so that when dried they are most firmly secured.

In Fig. 10 I show still another modification in which there is no reduction of the ends of the molded strip to form tongues, but each end is toothed and the teeth in one end fit into corresponding depressions in the other end, the parts being united together by patting or in any other suitable way. As a further special improvement in articles of this character, I attach the ear which holds one end of the bail to that portion of the pail where the two ends of the body are lapped and joined, the rivets extending entirely through both tongues in the one case or both ends proper in the other case, thus still further strengthening the vessel and preventing any danger of the joint coming apart if the vessel is filled with a heavy substance.

It will be understood that I do not desire to be limited in my invention to the special article herein shown and described, as the same features of construction and the same process might be used in the manufacture of wood, paper, or other pulp vessels of any character, such as tubs, cylinders, baskets, and the like. It will also be understood that I prefer to carry out the process and make articles by machinery, so that hand manipulation of the pulp will not be necessary. By my invention, however, I am enabled to dispense with the expensive process and machinery for carrying out the same where the vessels are molded in one piece, and I am also enabled to produce a pail stronger and more durable than those vessels of molded fibrous pulp, the parts of which are molded separately and then joined together.

Having thus described my invention, what I claim, and desire to secure by Letters Patent, is—

1. A pulp vessel having a molded body joined at its end and having formed at its lower end an inner peripheral recess with an upper shoulder and a base tapering downwardly and inwardly relatively to the inner wall of the vessel and having a bottom peripherally fitting that recess in the body all constructed as and for the purpose set forth.

2. A pail or other vessel of pulp, having a body molded and lapped end upon end forming a lap-joint from top to bottom with a metal strip corrugated or roughened on both sides fitting between the overlapping portions, and a suitable bottom secured to the body portion of the pail; substantially as described.

3. A pail or other vessel of wood or other suitable pulp, having a body molded and lapped end upon end forming a lap joint from top to bottom, and the ear riveted to said body portion at the joint, whereby the rivets which hold the ear in place serve to secure the lap portions together, a bail attached at one end to the ear, and a suitable bottom secured to the body portion; substantially as described.

4. A pail or other vessel, having the body portion formed with a lap joint, and having an internal peripheral beveled recess at its lower end, a bottom of peripheral thickness equal to the height of said recess, and having its external periphery beveled to correspond to the bevel of the recess to fit therein, whereby vertical separation of the body portion from the bottom is prevented, and a metallic roughened piece engaging the tongues or lap portions of the body; substantially as described.

5. A pail or other vessel having its body portion provided with an internal, peripheral recess at its lower end, said recess being of greatest width at its upper portion and beveled downwardly to the bottom of the body portion, so that the body portion is of the same thickness at the upper and lower ends of the recess, a bottom of peripheral thickness equal to the height of the recess and having its external periphery beveled to correspond to the bevel of the recess to fit therein whereby vertical separation of the body portion from the body is prevented, and means for securing the ends of the body portion together; substantially as described.

6. The process of making vessels from molded pulp, which consists in molding a sectoral body with its ends provided with tongues of less thickness than the thickness of the body portion, and the shorter side provided with an internal peripheral beveled recess, and molding a bottom with an external peripheral bevel to fit the recess in the body portion, then curving the body and lapping its tongues one upon the other, and applying the beveled internal recess to the beveled external periphery of the bottom, and, finally, compressing the vessel thus assembled to integrality at the joints; substantially as described.

7. The process of making vessels from molded pulp, which consists in first placing in the mold a strip of linen or other cloth conforming in shape to the blank to be molded, then pouring in the pulp, then laying upon the top thereof another similar strip of linen or other cloth, then removing the blank with the linen strips, and, while the blank is so held, bending the same to proper shape around the bottom of the vessel, then removing the interior linen cloth, then compressing the ends of the blank together and upon the bottom, and then removing the outside linen strip, all substantially as described.

In testimony whereof I affix my signature in presence of two witnesses.

WILLIAM W. McEWAN.

Witnesses:
ADOLPH G. WOLF,
CHAS. L. STURTEVANT.